US008529850B2

(12) United States Patent
Virnig et al.

(10) Patent No.: US 8,529,850 B2
(45) Date of Patent: *Sep. 10, 2013

(54) COMPOSITIONS AND METHODS OF USING A KETOXIME IN A METAL SOLVENT

(75) Inventors: Michael Virnig, Tucson, AZ (US); Jack Bender, Corona de Tucson, AZ (US); Nathan C. Emmerich, Tucson, AZ (US)

(73) Assignee: Cognis IP Management GmbH, Duesseldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/401,930

(22) Filed: Feb. 22, 2012

(65) Prior Publication Data
US 2012/0219475 A1   Aug. 30, 2012

Related U.S. Application Data

(60) Provisional application No. 61/446,878, filed on Feb. 25, 2011.

(51) Int. Cl.
B01D 11/00    (2006.01)

(52) U.S. Cl.
USPC ....... 423/9; 423/24; 423/54; 423/99; 423/139

(58) Field of Classification Search
USPC .................. 423/24, 9, 54, 99, 139
See application file for complete search history.

(56) References Cited

U.S. PATENT DOCUMENTS

| | | | |
|---|---|---|---|
| 3,284,501 A | 11/1966 | Swanson et al. |
| 3,428,449 A | 2/1969 | Swanson |
| 4,507,268 A | 3/1985 | Kordosky et al. |
| 4,544,532 A | 10/1985 | Kordosky et al. |
| 4,563,256 A | 1/1986 | Sudderth et al. |
| 4,957,714 A | 9/1990 | Olafson et al. |
| 4,978,788 A | 12/1990 | Dalton et al. |
| 5,176,843 A | 1/1993 | Dalton et al. |
| 5,231,336 A | 7/1993 | van Namen et al. |
| 5,470,552 A | 11/1995 | Kordosky et al. |
| 5,976,218 A | 11/1999 | Virnig et al. |
| 5,993,757 A | 11/1999 | Virnig et al. |
| 6,113,804 A | 9/2000 | Dalton et al. |
| 6,156,280 A | 12/2000 | Virnig et al. |
| 6,177,055 B1 | 1/2001 | Virnig et al. |
| 6,210,647 B1 | 4/2001 | Virnig et al. |
| 6,231,784 B1 | 5/2001 | Virnig et al. |
| 6,261,526 B1 | 7/2001 | Virnig et al. |
| 6,432,167 B1 | 8/2002 | Virnig et al. |
| 6,569,391 B1 | 5/2003 | Arias et al. |
| 6,596,053 B2 | 7/2003 | Virnig et al. |
| 6,632,410 B2 | 10/2003 | Kang et al. |
| 6,702,872 B1 | 3/2004 | Virnig et al. |
| 6,733,688 B1 | 5/2004 | Sugarman et al. |
| 7,309,474 B2 | 12/2007 | Soderstrom et al. |
| 7,585,475 B2 | 9/2009 | Virnig et al. |
| 7,993,613 B2 | 8/2011 | Virnig |
| 2001/0029811 A1 | 10/2001 | Olafson et al. |
| 2001/0055553 A1 | 12/2001 | Kang et al. |
| 2006/0222580 A1 | 10/2006 | Tinkler et al. |
| 2008/0035893 A1 | 2/2008 | Virnig et al. |
| 2008/0175772 A1 | 7/2008 | Virnig |
| 2010/0092357 A1 | 4/2010 | Campbell et al. |
| 2011/0178183 A1 | 7/2011 | Meyer-Boehm et al. |

FOREIGN PATENT DOCUMENTS

| | | |
|---|---|---|
| WO | WO-93/04208 | 3/1993 |
| WO | WO-99/10546 | 3/1999 |
| WO | WO-2010/034688 | 4/2010 |

OTHER PUBLICATIONS

"Solvent Extraction Reagents and Applications", *MCT Redbook* Cognis Group 2007, 80 pages.
Dixon, David G. et al., "Galvanox Treatment of Copper Concentrates", *ALTA* 2007, 18 pages.
Dreisinger, David, "New Developments in Hydromeallurgical Treatment of Copper Concentrates", *Engineering and Mining Journal* May 1, 2004, 28 pages.
Swanson, Ronald R. et al., "Liquid Ion Exchange: Organic Molecules for Hydrometallurgy", *International Solvent Exchange Conference* 1977.
Virnig, Michael J. et al., "Effects of nitrate on copper SX circuits: A case study.", *Proceedings Copper, vol. VI-Hydrometallurgy of Copper (Book1)* 2003, 15 pages.
Non-Final Office Action in U.S. Appl. No. 13/401,921, dated Sep. 7, 2012, 9 pgs.
Non-Final Office Action in U.S. Appl. No. 13/401,939, dated Oct. 19, 2012, 7 pgs.
Non-Final Office Action in U.S. Appl. No. 13/401,957, Sep. 12, 2012, 9 pgs.
PCT International Search Report in PCT/US2012/026584, mailed Sep. 20, 2012, 4 pgs.
Final Office Action in U.S. Appl. No. 13/401,921, dated Jan. 3, 2013, 9 pgs.
PCT International Search Report in PCT/US2012/026549, mailed Dec. 12, 2012, 4 pgs.
PCT International Search Report in PCT/US2012/026558, mailed Nov. 28, 2012, 4 pgs.

*Primary Examiner* — Steven Bos
(74) *Attorney, Agent, or Firm* — Bernard Lau

(57) ABSTRACT

Provided are methods using a ketoxime in metal extraction. One aspect of the invention relates to a method for the recovery of metal from a metal-containing aqueous solution at an elevated temperature using a ketoxime. Another aspect relates to a method of separating iron/copper using a specific ketoxime. Aldoximes may also be added to the reagent compositions used in these methods.

19 Claims, 1 Drawing Sheet

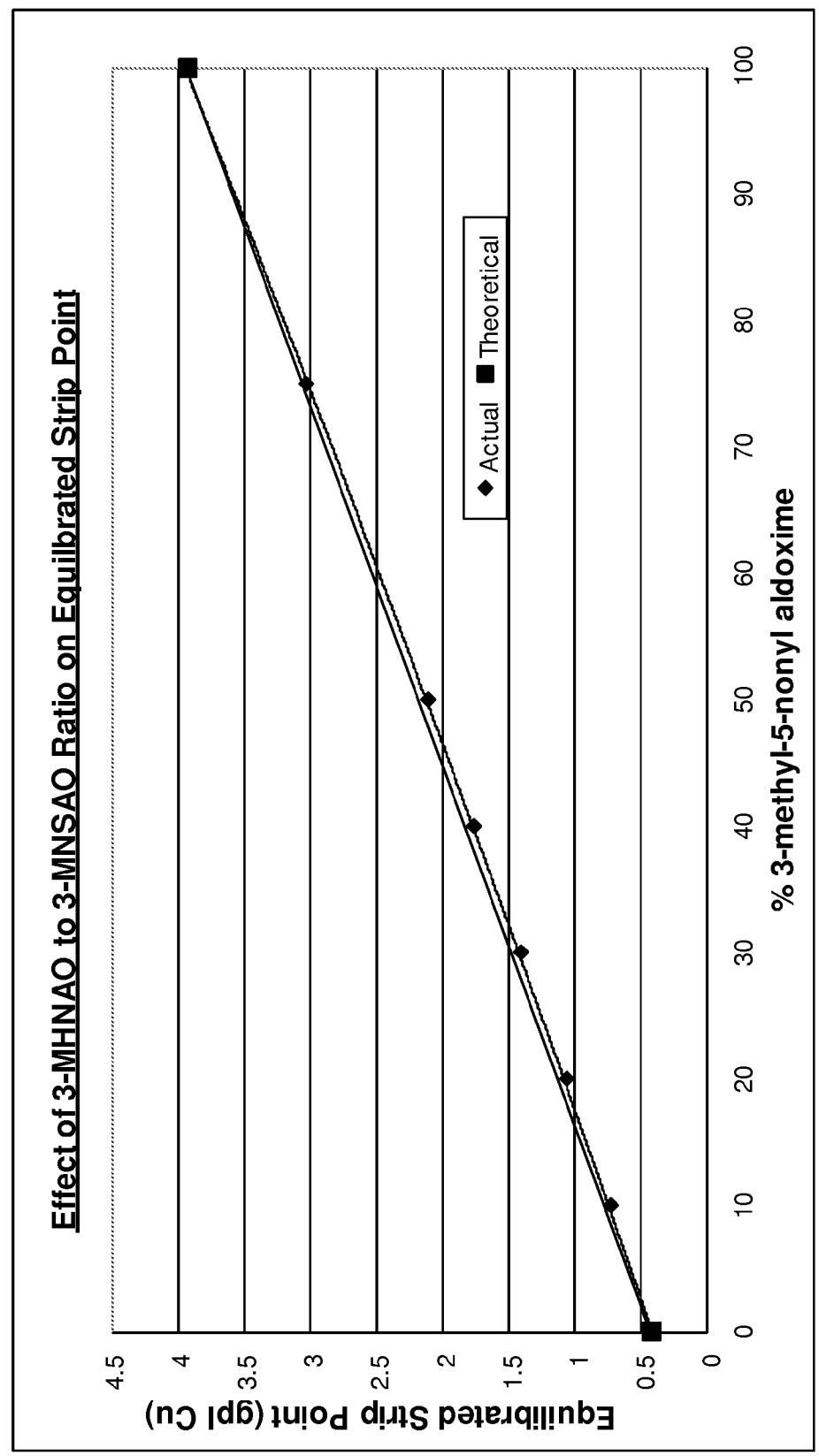

COMPOSITIONS AND METHODS OF USING A KETOXIME IN A METAL SOLVENT

CROSS REFERENCE TO RELATED APPLICATIONS

This application claims priority to U.S. Provisional Patent application No. 61/446,878, filed on Feb. 25, 2011, which is incorporated herein by reference in its entirety.

TECHNICAL FIELD

The present invention relates generally to the field of extractive metallurgy. In particular, the present invention relates to metal solvent extraction methods and reagents.

BACKGROUND

Copper and its metal alloys have been used for thousands of years. The importance of copper, as well as a variety of other metals, has led to a continuing search for more efficient and productive procurement methods. One method of copper extraction is a process of leaching, coupled together with solvent extraction, and finally copper production by electrowinning. Leaching is typically carried out by stacking the ore in piles on a prepared pad or by stacking it in a small canyon. A solution of sulfuric acid is then applied, and as the acid solution is trickled down through the heap, copper is dissolved from the rock. The resultant copper-bearing solution (pregnant leach solution or PLS) is collected, and then transferred to the solvent extraction plant, where it is contacted by vigorous mixing with an organic solution comprising an extractant dissolved in a kerosene-like hydrocarbon diluent. In this extraction, the copper (as cupric ion) is transferred to the organic phase, where it forms a chelate-type complex with the extractant. After contact, the mixture of aqueous and organic is allowed to separate. The copper-depleted aqueous solution (raffinate) exits the solvent extraction plant, and the organic is transferred to stripping, where it is contacted with a strong acid solution. In stripping, the cupric ion is transferred to the aqueous phase and protons are transferred to the organic. The now copper-depleted organic is returned to extraction for re-use. The copper-rich aqueous strip solution (pregnant or rich electrolyte) is transferred to electrowinning. In electrowinning, copper is plated as metal from solution at the cathode, and water is broken down at the anode to form oxygen and protons as acid. Depending on the climatic conditions at the site, the size of the ore heap or dump, and the irrigation rate, the temperature of the PLS entering the plant could range from about 10° C. to about 30° C. As a result, temperatures in extraction typically range from about 20 to 25° C., and temperatures in stripping may range from about 30 to 35° C. The temperature in the electrowinning cells is typically about 45° C., incorporated herein by reference. This acid leach process may also be used for other metals. Additionally, leaching with ammonia may be carried out analogously. Combinations of ammonia with an ammonium salt, such as ammonium carbonate or ammonium sulfate, have been used on a commercial scale to leach copper metal (recycling applications), copper oxide ores and copper sulfide ores. Ammonia leaching can be applied other metals such as nickel and zinc as well.

Reagents useful in such processes should generally possess certain qualities. Examples of important features are the rates of reaction, phase separation and reagent stability. A detailed discussion of the useful characteristics in a liquid ion exchange reagent is available in Swanson, "Liquid Ion Exchange: Organic Molecules for Hydrometallurgy" presented at the International Solvent Exchange Conference September 1977.

Several extractant reagents have been used, including some phenolic oxime extractants. Among those used are 5-nonylsalicylaldoxime, 5-nonyl-2-hydroxyacetophenone oxime and 5-dodecylsalicylaldoxime. However under certain conditions of use, the current reagents are not ideal and have had issues not yet fully addressed. For example, these aldoximes bind copper very tightly, and only a small part of the copper can be recovered in stripping under the commercially typical conditions of acid and copper content in the lean electrolyte that is used as strip media. To maximize stripping, one typically adds a thermodynamic modifier to the extractant. Alternatively, extractants can be formulated that have different relative extractant strengths, which strip significantly better than the standard aldoximes by themselves. Blends of aldoximes and ketoximes have been used, and demonstrate that ketoximes act as an extractant, as well as a thermodynamic modifier. However, the copper content on the stripped organic is lower than one would expect based on consideration of the stripping behavior of the individual oximes.

Another general problem is extractant loss (also known as degradation) via chemical hydrolysis to the corresponding ketone or aldehyde. The concentration of the hydrolysis products in the organic phase increases until the rate of formation equals the rate of loss in entrainment. The rate at which hydrolysis occurs is dependent on the acid concentration and the temperature of the system. Current reagents may not work properly due to hydrolysis. One trend in the industry is towards the treatment of primary copper sulfide concentrates by hydrometallurgical routes rather than smelting. These processes result in the production of leach solutions which are very warm. Solutions fed to the copper solvent extraction process will range in temperatures from about 35° C. to 50° C., or higher. Higher temperatures also occur when the oxide ores are extremely rich, such as the ores from the Democratic Republic of the Congo. They are typically vat or agitation leached with sulfuric acid. The leaching reactions are quite exothermic, resulting in PLS for extraction that are higher in temperature than typical heap or dump leach operations. The higher temperature results in a significantly higher rate of hydrolysis of the oxime extractants. This leads to buildup of the hydrolysis products in the circuit organics to very high levels relative to that observed in typical head and dump leach operations. Due to the higher rate of degradation, the level of degradation products can approach levels as high as 100% of the oxime concentration in the circuit organics. This results in a significant increase in the density and viscosity of the organic phase, which in turn is reflected in slower phase disengagement and higher entrainments.

Another problem with current technology is with copper selectivity over iron. Copper/iron selectivity is very important for some solvent extraction/electrowinning systems. Iron that is transferred to the electrowinning system has a negative effect on the processing of copper in the electrolyte. As the concentration of ferric ions increases, there is a substantial drop in current efficiency. In addition to the cost incurred by the drop in current efficiency, there is the additional cost of bleeding the system to control the iron concentration. Bleeding electrolyte results in the reduction of cobalt concentration (in addition to other additives) which is added to protect lead anodes, and this can be a large expense in an electrowinning plant.

Current reagent technology could also be improved when nitrate is present in the PLS or strip solution. Nitrate in the PLS or strip solution can lead to attack on the phenolic oximes resulting in nitration of the ring to form the corresponding 3-nitro aldoximes or ketoxime. The nitro oximes are extremely strong copper chelators. They cannot be stripped under typical plant conditions resulting in loss of net transfer. Such problems are discussed in the Virnig, et al., "Effects of nitrate on copper SX circuits: A case study" in Proceedings Copper 2003-Cobre 2003, Vol VI-Hydrometallurgy of Copper (Book1), edited by P. A. Riveros, D. Dixon, D. B. Dreisinger, J. Menacho; Canadian Institute of Mining, Metallurgy and Petroleum; Montreal, Quebec, Canada; 2003, pp 795-810. There have been attempts to deal with this nitration issue. For example, it has been proposed to add lower molecular weight phenol to the extractant formulation as a sacrificial lamb. The phenol is more readily nitrated than is the oxime, and so long as there is any phenol present, the oxime is protected. However, as soon as the phenol is consumed, then nitration of the oxime will occur.

Yet another problem relates to currently used oximes for extraction of copper and nickel from ammoniacal solutions. In applications involving extraction of nickel or copper from ammonia, one typically finds that degradation of the organic by hydrolysis of the oxime is an issue. During such extraction, the resultant complex carries with it some chemically bound ammonia, which is undesirable. The ammonia is transferred to stripping where it consumes acid to form the corresponding ammonium salt which builds up overtime in the circulating electrolyte and can lead to the formation of insoluble salts such as nickel ammonium sulfate which can cause plugging of lines, etc. There is thus a need for reagents and/or methods that address one or more of these problems.

SUMMARY

One aspect of the invention relate to a method for the recovery of metal from a metal-containing aqueous solution at an elevated temperature. The method comprises contacting the metal-containing aqueous solution with an organic phase comprising a water immiscible solvent and a reagent composition comprising a ketoxime having a structure represented by:

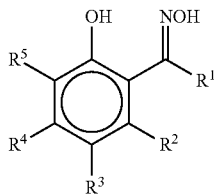

wherein $R^5$ is a $C_{1-22}$ linear or branched alkyl group; $R^1$ is a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group to extract at least a portion of the metal values into the organic phase to provide a metal-pregnant organic phase and a metal-barren aqueous phase; separating the resultant metal-pregnant organic phase from the metal-barren aqueous phase; and recovering metal values from the metal-pregnant organic phase. In one or more embodiments, the metal is selected from the group consisting of copper, uranium, molybdenum, nickel, zinc, cobalt and combinations thereof. In yet other embodiments, the reagent composition further comprises a thermodynamic modifier and/or kinetic modifier.

In various embodiments, $R^5$ is methyl and/or $R^3$ is nonyl. In a particular embodiment, the ketoxime has a structure represented by:

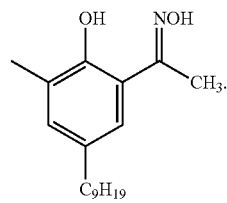

In one or more embodiments of this aspect, the reagent composition further comprises an aldoxime having a structure represented by:

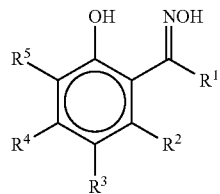

wherein $R^5$ is a $C_{1-22}$ linear or branched alkyl group; $R^1$ is hydrogen; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group. In various embodiments, $R^5$ is methyl, $R^3$ is nonyl, and/or $R^3$ is dodecyl. In a particular embodiment, the aldoxime is a 3-methyl aldoxime having a structure represented by:

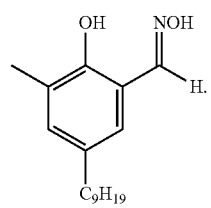

In one or more embodiments, the temperature of metal recovery can be varied. For example, in one variant, the recovery of metal occurs at a temperature above about 35° C., or more particularly, at a temperature above about 50° C.

The amounts of oxime(s) can also be varied. Thus, in other embodiments of this aspect the concentration of oxime ranging from about 0.018M to about 1.1M. In another embodiment, the concentration of ketoxime ranges from about 0.018M to about 0.9M, or more particularly, from about 0.018M to about 0.72M. In yet another embodiment where there are both ketoximes and aldoximes, the concentration of both ketoxime and aldoxime ranges from about 0.018M to about 0.9M, or more particularly, 0.018M to about 0.72M. In yet other embodiments, the ketoxime is a 3-methyl ketoxime and the aldoxime is a 3-methyl aldoxime, and the reagent composition comprises a molar ratio of ketoxime to aldoxime having a range of about 85:15 to about 25:75.

Another aspect of the invention relates to a method of separating copper from iron in an aqueous solution containing dissolved copper and iron values. The method comprises contacting the aqueous solution with a water-immiscible organic solution comprising a hydrocarbon solvent and a 3-methyl ketoxime having a structure represented by:

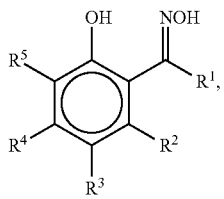

wherein $R^1$ is $CH_3$, $R^3$ is a C8, C9 or C12 alkyl group, $R^2$ and $R^4$ are hydrogen, $R^5$ is a methyl group, to form an aqueous phase comprised of iron and an organic phase comprised of the hydrocarbon solvent and a copper-extractant complex wherein the copper-extractant complex is soluble in the hydrocarbon solvent; separating the organic phase from the resultant aqueous phase; and recovering copper values from the organic phase. In a particular embodiment, $R^3$ is nonyl. In one or more embodiments, the organic solution further comprises a thermodynamic modifier and/or kinetic modifier.

In certain embodiments, this aspect pertains to variants wherein the water immiscible organic solution further comprises a 3-methyl aldoxime, having a structure represented by:

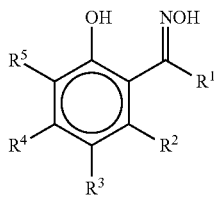

wherein $R^1$ is H, $R^3$ is a C8, C9 or C12 alkyl group, $R^2$ and $R^4$ are hydrogen, $R^5$ is a methyl group. In a particular embodiment, the 3-methyl aldoxime has a structure represented by:

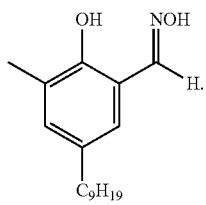

In other embodiments, the ketoxime and aldoxime are present in a molar ratio of ketoxime to aldoxime having a range of about 85:15 to about 25:75.

Yet another aspect of the invention relates to a reagent composition comprising a first oxime having a structure represented by:

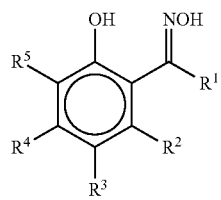

wherein $R^5$ is a $C_{1-22}$ linear or branched alkyl group; $R^1$ is a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR_6$ wherein $R^6$ is a $C_{1-22}$ linear or branched alkyl group, a $C_{2-22}$ linear or branched alkenyl group, a $C_6$ aryl group, or a $C_{7-22}$ aralkyl group; and 5,8-diethyl-7-hydroxydodecan-6-oxime.

BRIEF DESCRIPTION OF THE DRAWINGS

FIG. 1 is a graphical representation of the level of copper in several stripped organic solutions containing various ratios of 3-methyl ketoxime and 3-methyl aldoxime.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The term "NSAO" as used herein is used interchangeably with 5-nonylsalicylaldoxime, and refers to a compound having the structure:

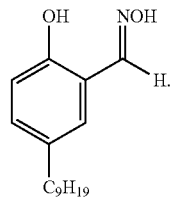

The term "DSAO" as used herein is used interchangeably with 5-dodecylsalicylaldoxime, and refers to a compound having the structure:

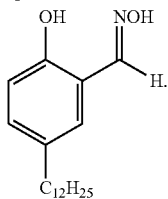

The term "HNAO" as used herein is used interchangeably with 5-nonyl-2-hydroxyacetophenonoxime, and refers to a compound having the structure:

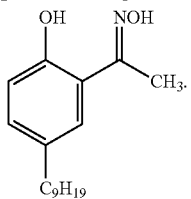

The term "3-MNSAO" as used herein is used interchangeably with 3-methyl-5-nonylsalicylaldoxime, and refers to a compound having the structure:

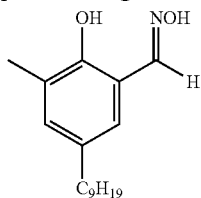

The term "3-MHNAO" as used herein is used interchangeably with 3-methyl-5-nonyl-2-hydroxyacetophenone oxime, and refers to a compound having the structure:

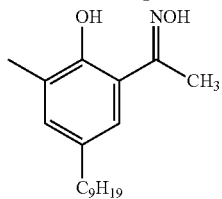

The term "3-methyl oxime" as used herein refers to a compound having a structure represented by:

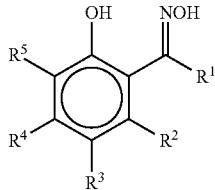

wherein $R_5$ is methyl; $R_1$ is hydrogen, a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group.

The term "3-methyl ketoxime" as used herein refers to a compound having a structure represented by:

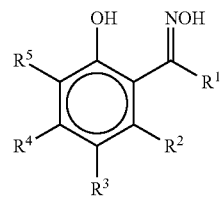

wherein $R_5$ is methyl; $R_1$ is a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group The term "3-methyl aldoxime" as used herein refers to a compound having a structure represented by:

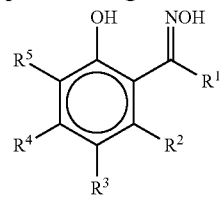

wherein $R_5$ is methyl; $R_1$ is hydrogen; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group.

Reagents

A first aspect of the invention relates to reagent compositions. In one or more embodiments, the compositions comprise a mixture of at least two oximes, a ketoxime and an aldoxime. The ketoxime has a structure represented by Formula I:

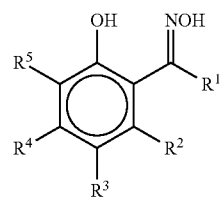

wherein $R_5$ is a $C_{1-22}$ linear or branched alkyl group; $R_1$ is a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group; and the aldoxime has a structure represented by Formula II:

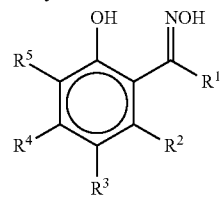

wherein $R_5$ is a $C_{1-22}$ linear or branched alkyl group; $R_1$ is hydrogen; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group.

In one embodiment of the invention, the $R^3$ is a $C_{8-12}$ linear or branched alkyl group for Formula I and/or Formula II. In another embodiment, the $R^3$ of Formula I and/or II is dodecyl. In yet other embodiment, the $R^3$ of Formula I and/or II is nonyl. In yet another embodiment, $R^5$ is a $C_{1-3}$ linear or branched alkyl or alkoxy group for the compound of Formula I and/or II.

In one embodiment, the ketoxime (Formula I) and aldoxime (Formula II) reagents each have a methyl group substituted at the $R^5$ position. In another embodiment, the ketoxime has a structure represented by Formula III:

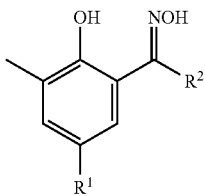

wherein $R^1$ is hydrogen, halogen, a linear or branched $C_{6-12}$ alkyl group and $R^2$ is a $C_{1-22}$ linear or branched alkyl or alkenyl group; and the aldoxime has a structure represented by Formula IV:

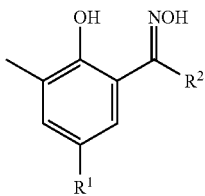

wherein $R^1$ is hydrogen, halogen, a linear or branched $C_{6-12}$ alkyl group and $R^2$ is hydrogen.

In yet another embodiment, the ketoxime is a 3-methyl ketoxime having a structure represented by:

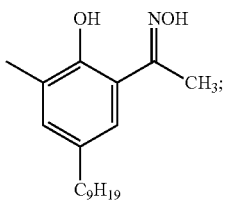

and the aldoxime is a 3-methyl aldoxime having a structure represented by:

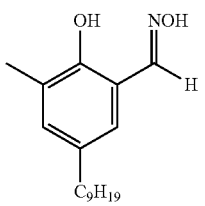

In one or more embodiments where a ketoxime and aldoxime are used, the ratio of ketoxime to aldoxime can be varied. In various embodiments, the molar amount of ketoxime can be about 25%, 30%, 40%, 50%, 60%, 65% 70%, 75%, 80%, or 85% of the total amount of oxime. Thus, in a specific embodiment, the molar ratio of ketoxime to aldoxime is about 85% ketoxime to about 15% aldoxime. In another specific embodiment, the molar ratio of ketoxime to aldoxime is about 60% ketoxime to about 40% aldoxime. In yet another embodiment, the molar ratio of ketoxime to aldoxime ranges from about 85:15 to about 25:75, more specifically from about 80:20 to about 30:70, and even more specifically from about 80:20 to about 40:60. Accordingly, in a very specific embodiment, the molar ratio of 3-methyl ketoxime to 3-methyl aldoxime is about 85% ketoxime to about 15% aldoxime. In another specific embodiment, the molar ratio of 3-methyl ketoxime to 3-methyl aldoxime is about 60% ketoxime to about 40% aldoxime.

Methods of making such individual reagent compounds are known in the art, such as those disclosed in U.S. Pat. No. 6,632,410, the entire contents of which are incorporated herein by reference. For example, 3-methyl-5-nonylsalicylaldoxime can be made by reacting o-cresol with tripropylene in the presence of an acid catalyst such as AMBERLYST® 15 resin to form 4-nonyl-2-cresol which is in turn converted to the aldehyde by reaction with para-formaldehyde in the presence of a catalyst such as titanium cresylate. The 3-methyl-5-nonylsalicylaldehyde is then reacted with hydroxylamine sulfate to form the 3-methyl-5-nonylsalicylaldoxime. In all cases, the total number of carbon atoms in all of $R^2$-$R^5$ groups must be great enough so that the corresponding copper-extractant complex is soluble in the hydrocarbon solvent.

The feedstock solution containing dissolved metal values is contacted with the water-immiscible organic solution comprised of a hydrocarbon solvent as described herein and one or more reagent compositions of the Formula I and/or Formula II for a period of time sufficient to allow the oxime described herein to form a complex with the iron and copper ions. The feedstock can be contacted by the organic solution in any manner that brings the two immiscible phases together for a period of time sufficient to allow the compounds of Formula I and/or Formula II to form a complex with the metal ions. This includes shaking the two phases together in a separatory funnel or mixing the two phases together in a mix tank as described in U.S. Pat. No. 4,957,714, the entire contents of which are incorporated herein by reference.

Reagent compositions according to one or more embodiments include modifiers that can be added to the reagent to increase functionality. U.S. Pat. Nos. 4,978,788; 6,177,055; 6,231,784; 7,585,475 and 7,993,613, the contents of which are incorporated herein by reference, provide examples of modifiers that can be used in accordance with embodiments of the present invention. For example, the use of highly branched chain aliphatic or aliphatic-aromatic $C_{10}$-$C_{30}$ esters or $C_{10}$-$C_{30}$ alcohols have beneficial results as strip modifiers. Another example is an equilibrium modifier, where the modifier is a linear diester or polyester of an unbranched monocarboxylic acid or unbranched dicarboxylic acid and an unbranched alcohol. One embodiment of the invention is the reagent composition described above, further comprising thermodynamic modifiers. A second embodiment is the reagent composition described above, further comprising kinetic modifiers. Examples of suitable kinetic modifiers include, but are not limited to, dioximes such as 8,9-dioximohexadecane or alpha-bromocarboxylic acids such as alpha-bromolauric acid. In a particular embodiment, the kinetic modifier comprises 5,8-diethyl-7-hydroxydodecan-6-oxime.

The reagent compositions in one or more embodiments include a solvent in which the reagent is dissolved. In one embodiment, the solvent comprises a water immiscible organic solvent. In another embodiment, the water immiscible organic solvent is selected from the group consisting of kerosene, benzene, toluene, xylene and combinations thereof.

The oximes in the composition can be present in any suitable concentration for extraction. For example, in one or more embodiments, concentration of the oxime ranges from about 0.018M to about 1.1M. In specific embodiments, the concentration of oxime ranges from about 0.018M to about 0.9M or 0.018M to about 0.72M. In embodiments in which a ketoxime and aldoxime are present, the concentration of both ketoxime and aldoxime ranges from about 0.018M to about 0.9M or from about 0.018M to about 0.72M. The reagent composition may also be concentrated. Concentrated forms can be useful, for example, for transporting the reagent composition. Several embodiments of concentrated forms can have an oxime concentration of about 1.7M or about 1.8M and up to about 2.25M, 2.5M, and 2.6M. This oxime concentration can be the combined concentration of the oximes in embodiments where more than one oxime is present.

A second aspect of the invention relates to a reagent composition comprising a first oxime having a structure represented by:

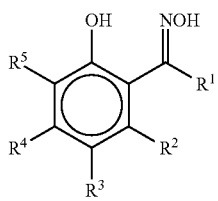

wherein $R^5$ is a $C_{1-22}$ linear or branched alkyl group; $R^1$ is a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group; and 5,8-diethyl-7-hydroxydodecan-6-oxime.

Processes for Metal Recovery

Another aspect of the invention relates to a method for the recovery of a metal from a metal-containing aqueous solution, the method comprising: contacting the metal-containing aqueous solution with an organic phase comprising a water immiscible solvent and a reagent composition comprising a mixture of a first oxime represented by formula I and a second oxime represented by formula II to extract at least a portion of the metal values into the organic phase; separating the resultant metal-pregnant organic phase from the resultant metal-barren aqueous phase; and recovering metal values from the metal-pregnant organic phase. In one embodiment, copper from a copper-containing aqueous solution is recovered, which includes contacting the copper-containing aqueous solution with an organic phase comprising a water immiscible solvent and a reagent composition of the type described herein. Another embodiment is where the recovered metal is selected from the group consisting of uranium, molybdenum, cobalt, copper, nickel and combinations thereof. Other specific embodiments of such methods will be described further herein.

In one embodiment, the ketoxime (Formula I) and aldoxime (Formula II) reagents each have a methyl group substituted at the $R^5$ position. In another embodiment, the ketoxime has a structure represented by Formula III:

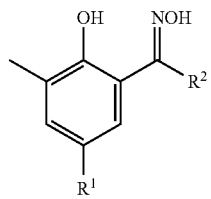

wherein $R^1$ is hydrogen, halogen, a linear or branched $C_{6-12}$ alkyl group and $R^2$ is a $C_{1-22}$ linear or branched alkyl or alkenyl group; and the aldoxime has a structure represented by Formula IV:

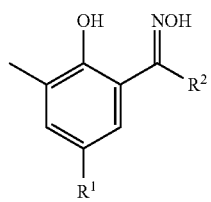

wherein $R^1$ is hydrogen, halogen, a linear or branched $C_{6-12}$ alkyl group and $R^2$ is hydrogen.

In yet another embodiment, the ketoxime is a 3-methyl ketoxime having a structure represented by:

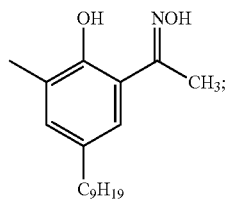

and the aldoxime is a 3-methyl aldoxime having a structure represented by:

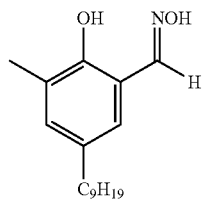

As will be appreciated in light of the above discussion of the results of the degradation testing, in one or more embodiments, the method includes 3-methyl reagents are used for extraction occurring over a wider temperature range than is presently commercially feasible with existing reagents. As discussed above, extraction of extremely rich oxide ores, processes that result in the production of warmer leach solutions and processes conducted in warmer climates require improved reactant compositions capable of operating at higher temperatures than is presently possible. In one embodiment, the metal recovered is selected from the group consisting of copper, uranium, molybdenum, nickel, zinc, cobalt and combinations thereof. In another embodiment, the metal recovered is copper.

One or more embodiments of the reagents described herein are thus suitable for metal recovery at an elevated temperature. Thus, another aspect of the invention relates to a method for the recovery of metal from a metal-containing aqueous solution at an elevated temperature, the method comprising: contacting the metal-containing aqueous solution with an organic phase comprising a water immiscible solvent and a reagent composition comprising a ketoxime having a structure represented by:

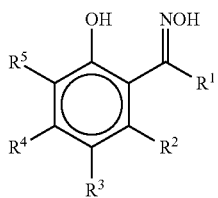

wherein $R^5$ is a $C_{1\text{-}22}$ linear or branched alkyl group; $R^1$ is a $C_{1\text{-}22}$ linear or branched alkyl or alkenyl group, a $C_6$ aryl group or a $C_{7\text{-}22}$ aralkyl group; $R^2$-$R^4$ are each independently hydrogen, halogen, a linear or branched $C_{6\text{-}12}$ alkyl group, $OR^6$ wherein $R^6$ is a $C_{1\text{-}22}$ linear or branched alkyl group, a $C_{2\text{-}22}$ linear or branched alkenyl group, a $C_6$ aryl group, or a $C_{7\text{-}22}$ aralkyl group to extract at least a portion of the metal values into the organic phase to provide a metal-pregnant organic phase and a metal-barren aqueous phase; separating the metal-pregnant organic phase from the resultant metal-barren aqueous phase; and recovering metal values from the metal-pregnant organic phase.

In one or more embodiments, reagent compositions and processes for recovering copper are provided that can be used in the range of about 15° C. to about 60° C. In specific embodiments, reagent compositions and processes of copper extraction using such compositions can be performed at temperatures exceeding 30° C., 35° C., 40° C., 45° C., and 50° C. In specific embodiments, extraction can be carried out in the range of about 25° C. to about 60° C., of about 25° C. to about 50° C., of about 35° C. to about 60° C., and of about 35° C. to about 50° C. Other variants of ranges within the values discussed above are possible. The oxime reagents described herein are advantageously used at higher temperatures, as currently used oximes undergo hydrolytic degradation and cause operational problems and increased cost.

In embodiments in which the recovery of copper is performed at an elevated temperature, the composition can include a ketoxime represented by the structure of formula I described above. In specific embodiments, the composition can comprise a mixture containing a ketoxime represented by the structure of formula I and an aldoxime represented by the structure of formula II described above. In one or more embodiments, the composition can include a solvent and modifiers as described above.

According to one or more embodiments, a feature of one or more of the reagent compositions and/or methods described herein is that they exhibit improved hydrolytic stability compared to currently used oximes for extraction. While not wishing to be bound by theory, it is possible that a combination of effects leads to the added stability. For example, with 3-methyl aldoxime and 3-methyl ketoxime, it is believed that the methyl group ortho to the phenol changes the orientation of the oxime functional group at the interface. This change in orientation shelters the oxime functional group from hydrolysis.

One advantage of one or more of the reagents and methods described herein is resistance to nitration. Nitration of current reagents (DSAO, NSAO, and HNAO) is accomplished by electrophilic aromatic substitution which is illustrated in Schematic 1. As the nitro oximes are extremely strong copper chelators, they cannot be stripped under typical plant conditions resulting in a loss of net transfer. The oxime depicted in Schematic 1 can be used to represent any of the current reagents. The nitration can only take place at the position ortho to the phenol due to the resonance stabilization it affords the intermediate (2). This is a well known general reaction scheme in synthetic chemistry and has been investigated thoroughly.

Schematic 1:

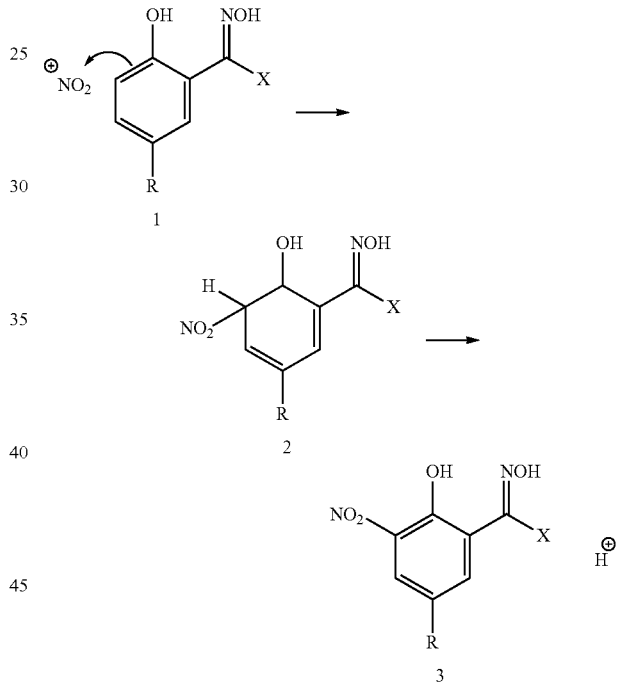

In the case of the new extractants, substitution at the position ortho to the phenol group prevents nitration. This renders these compounds nitration resistant under the conditions found in typical mining solutions. In one embodiment, 3-methyl ketoximes and 3-methyl aldoximes, (including, but not limited to, 3-MHNAO and 3-MNSAO) are used, such that the methyl group ortho to the phenol group prevents nitration.

The metal according to such processes containing nitrate can include, but are not limited to, the metals selected from the group consisting of copper, molybdenum, uranium, rare earth metals (scandium, yttrium, lanthanum, cerium, praseodymium, neodymium, promethium, samarium, europium, gadolinium, terbium, dysprosium, holmium, erbium, thulium, ytterbium, and lutetium) and combinations thereof. In a specific embodiment, the metal is copper. In one embodiment, the nitrate-containing aqueous solution has a concentration of nitrate that ranges from about 1 grams per liter to about 50 grams per liter, and more specifically 3 grams per liter to about 35 grams per liter. In specific embodiments, the nitrate-containing aqueous solution also contains chloride, wherein the chloride has a concentration ranging from about 1 gram per liter to about 30 grams per liter. In one or more embodiments, the pH of the nitrate-containing aqueous solution ranges from about 0.6 to about 2.0.

Such methods of extracting a metal from a nitrate-containing aqueous solution may also have applicability in proposed leaching schemes such as those described in U.S. Pat. No. 6,569,391, where sodium nitrate is added to a dilute sulfuric acid solution to leach copper sulfides. U.S. Pat. No. 6,569,391 is herein incorporated by reference in its entirety.

3-methyl aldoximes, 3-methyl ketoximes and their blends transfer much lower quantities of iron than HNAO. The transfer of iron is very dependent on the conditions used in the static test. However, HNAO transfers between 2-10 times more iron than the analogous 3-methyl species. In most cases, the iron values are so low that they are at the limits of detection. The excellent results of the iron/copper selectivity are demonstrated in Example 2 below.

Accordingly, another aspect of the invention pertains to separating copper from iron in an aqueous solution containing dissolved copper and iron values. In one embodiment, separating copper from iron in an aqueous solution containing dissolved copper and iron values includes contacting the aqueous solution with a water-immiscible organic solution comprising a hydrocarbon solvent and a 3-methyl ketoxime. In another aspect, the invention relates to a method of separating copper from iron in an aqueous solution containing dissolved copper and iron values, the method comprising: contacting the aqueous solution with a water-immiscible organic solution comprising a hydrocarbon solvent and a 3-methyl ketoxime having a structure represented by:

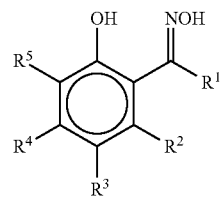

wherein $R^1$ is $CH_3$, $R^3$ is a C8, C9 or C12 alkyl group, $R^2$ and $R^4$ are hydrogen, $R^5$ is a methyl group, to form an aqueous phase comprised of iron and an organic phase comprised of the hydrocarbon solvent and a copper-extractant complex wherein the copper-extractant complex is soluble in the hydrocarbon solvent; separating the organic phase from the resultant aqueous phase; and recovering copper values from the organic phase. In particular embodiments, $R^3$ is nonyl.

In a particular embodiment, the 3-methyl ketoxime has a structure represented by:

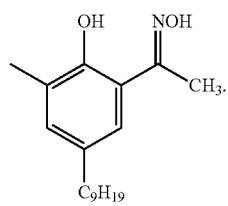

In one or more embodiments of this aspect, the water immiscible organic solution further comprises a 3-methyl aldoxime, having a structure represented by:

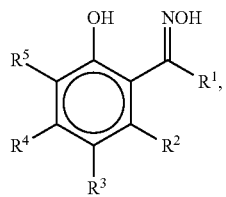

wherein $R^1$ is H, $R^3$ is a C8, C9 or C12 alkyl group, $R^2$ and $R^4$ are hydrogen, $R^5$ is a methyl group. In a particular embodiment, the 3-methyl aldoxime has a structure represented by:

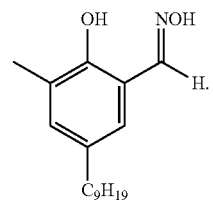

In one or more embodiments where a ketoxime and aldoxime are used, the ratio of ketoxime to aldoxime can be varied. In various embodiments, the molar amount of ketoxime can be about 25%, 30%, 40%, 50%, 60%, 65% 70%, 75%, 80%, or 85% of the total amount of oxime. Thus, in a specific embodiment, the molar ratio of ketoxime to aldoxime is about 85% ketoxime to about 15% aldoxime. In another specific embodiment, the molar ratio of ketoxime to aldoxime is about 60% ketoxime to about 40% aldoxime. In yet another embodiment, the molar ratio of ketoxime to aldoxime ranges from about 85:15 to about 25:75, more specifically from about 80:20 to about 30:70, and even more specifically from about 80:20 to about 40:60. Accordingly, in a very specific embodiment, the molar ratio of 3-methyl ketoxime to 3-methyl aldoxime is about 85% ketoxime to about 15% aldoxime. In another specific embodiment, the molar ratio of 3-methyl ketoxime to 3-methyl aldoxime is about 60% ketoxime to about 40% aldoxime.

One or more of the reagent compositions and methods described herein may also be used for extraction from ammoniacal solutions. In particular, these may be used to extract nickel, cobalt and/or zinc from ammoniacal solutions. For example, nickel can be extracted from ammoniacal solutions using HNAO. Depending on the nickel ammonia complex, the reaction proceeds using either Scheme 2 or Scheme 3.

$Ni(NH_3)_4^{+2}+2RH \rightarrow R_2Ni+2NH_3+2NH_4^+$     Scheme 2

$Ni(NH_3)_6^{+2}+2RH \rightarrow R_2Ni+4NH_3+2NH_4^+$     Scheme 3

Cobalt is often found in conjunction with nickel. It is advantageous to convert $Co^{+2}$ to $Co^{+3}$ by oxidation, because nickel is extracted selectivity over $Co^{+3}$ by ketoximes. Considering that data suggests that cobalt-loading can lead to faster degradation of the ketoxime, the added stability and possible lower cobalt loading of the 3-methyl ketoxime (including, but not limited to, 3-MHNAO) would be advantageous for nickel extraction.

Therefore, another aspect of the invention pertains to methods of extracting metal from aqueous ammoniacal solutions containing metal values comprising: contacting an ammoniacal solution containing metal values with an organic solution comprising a water immiscible organic solvent containing dissolved extractant comprising an oxime having a structure represented by:

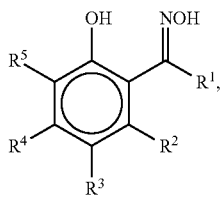

wherein $R^1$ is hydrogen or $CH_3$, $R^3$ is a C8-12 alkyl group, $R^2$ and $R^4$ are hydrogen, $R^5$ is a methyl group, forming a water immiscible organic phase, whereby metal values are extracted from the aqueous ammoniacal solution into the organic phase, thereby providing a metal-pregnant organic phase and a metal barren aqueous phase; separating the metal-barren aqueous phase from the metal-pregnant organic phase; and recovering the metal values from the metal-pregnant organic phase. In one or more embodiments, the metal is selected from one or more of nickel, zinc and copper. In other embodiments, $R^3$ is octyl, nonyl or dodecyl.

In specific embodiments, the oxime can have a structure represented by:

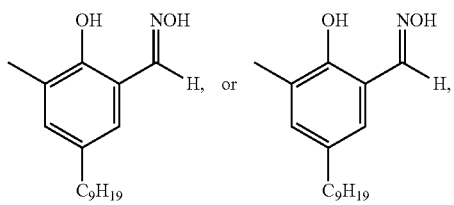

or mixtures thereof.

The addition of ammonia antagonists such as those described in U.S. Pat. No. 6,210,647, the contents of which are herein incorporated by reference, would also be expected to result in further reductions in ammonia loading when combined with the 3-MNSAO or 3-MHNAO or blends thereof. Such ammonia antagonists are referred to as "non-hydrogen bond donating" and are only "hydrogen bond accepting" compounds. The ammonia antagonists for use in the present improvement are those organic hydrogen bond acceptor compounds containing one or more of the following organic functionalities: ester, ketone, sulfoxide, sulfone, ether, amine oxide, tertiary amide, phosphate, carbonate, carbamate, urea, phosphine oxide, and nitrile and having greater than 8 carbon atoms, up to about 36 carbon atoms and a water solubility of less than 100 ppm, more desirably less than 50 ppm and preferably less than 20 ppm. In a specific embodiment, the ammonia antagonist comprises 2,2,4-trimethylpentane-1,3-diol diisobutyrate. Other illustrative ammonia antagonists which are only hydrogen bond acceptor compounds are: alkyl esters and dialkyl ketones in which the alkyl groups contain from 4 to about 12 carbon atoms, such as isobutyl isooctanoate and isobutyl heptyl ketone and the dinitrile of dimerized fatty acids such as dimerized C18 fatty acids, (Dimer Acid™ dinitrile).

In yet another aspect, the invention pertains to methods of recovering metal from an aqueous solution, comprising: contacting an aqueous solution containing at least two metals selected from molybdenum, cobalt, nickel, zinc and iron with an organic solvent and an oxime-containing reagent composition comprising an oxime having a structure represented by

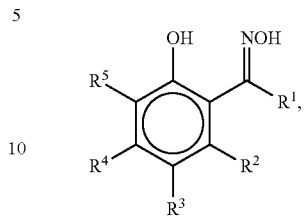

wherein $R^1$ is hydrogen or $CH_3$, $R^3$ is a C8-12 alkyl group, $R^2$ and $R^4$ are hydrogen, $R^5$ is a methyl group, at a predetermined pH, the predetermined pH selected to provide a high first metal extraction and a low second metal extraction; and separating the first metal from the solution. In specific embodiments, $R^3$ is nonyl. In other specific embodiments, the oxime used can be

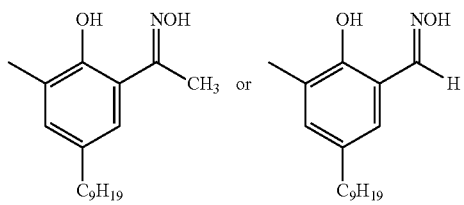

or mixtures thereof. The metals can be zinc, nickel, molybdenum and cobalt.

According to one or more embodiments, the oxime compositions exhibit one or more useful features including one or more of hydrolytic stability, good selectivity, fast kinetics and resistance to nitration. The following non-limiting examples are intended to demonstrate one or more of these features.

EXAMPLES

Example 1

Solutions (0.175 M) of 3-methyl-5-nonyl ketoxime and 3-methyl-5-nonyl aldoxime in Conosol® 170ES, a typical hydrocarbon diluent from Conoco Phillips®, for solvent extraction applications, were prepared. These solutions were then blended in the following proportions (ketoxime:aldoxime): 100:0, 90:10, 80:20, 70:30, 60:40, 50:50, 25:75 and 0:100. Each solution was then contacted with a synthetic lean electrolyte containing 35 gpl of copper as copper sulfate and 160 gpl of sulfuric acid in deionized water by shaking for 3 minutes at an organic to aqueous ratio of 1. The phases were separated after shaking and the process was repeated for a total of 4 contacts. The equilibrated organic phase was then filtered through phase separation paper to remove residual entrainment and analyzed for copper content by atomic absorption spectroscopy. The results are summarized in FIG. 1.

As discussed above, the known mixtures of ketoxime with aldoxime have a copper content in the stripped organic that is lower than one would expect based on consideration of the stripping behavior of the individual oximes. In contrast, the results of Example 1 and FIG. 1 demonstrate that the 3-methyl-ketoxime and 3-methyl-aldoxime blend does not behave in this way. The level of copper in the stripped organics containing various ratios of 3-methyl-ketoxime to 3-methyl-aldoxime very closely approximate a straight line, corresponding to what would be expected theoretically. A very slight downward bow in FIG. 1 is within the experimental error of the method.

Example 2A

Organic solutions were prepared by dissolving LIX® 860N-1, LIX® 664N-LV and LIX®8180 in Conosol® 170ES at approximately 10% v/v so that the resultant solutions contained about 0.175 M standard aldoxime or ketoxime. LIX® 860N-1 is a solution of 5-nonylsalicyladoxime in Shellsol® D70, a hydrocarbon diluent from Shell Chemical. LIX® 664N-LV is a solution of 5-nonylsalicyladoxime and di-n-butyladipate (0.8 M) in Shellsol D70. LIX® 8180 is a solution of 2-hydroxy-5-nonylacetophenone oxime in Shellsol D70. Solutions of 3-methyl-5-nonylsalicyladoxime and 3-MHNAO (3-MHNAO) (0.175 M) in Conosol® 170ES were also prepared. A series of blends were also prepared by mixing the above solutions to give a 50:50 blend on a volume basis of the LIX® 860N-1 solution, the LIX® 664N-LV and LIX® 8180 with the 3-MHNAO solution. The resultant solutions were then carried through the Standard Cognis Quality Control Test for LIX® Oxime Reagents with the following modifications. The standard 1 liter glass beaker was replaced with a jacketed beaker so that the temperature could be controlled precisely at 25° C. Samples of the emulsion were removed at 30, 60, 90, and 300 seconds. The 300 second point was defined as 100% of equilibrium. The organic samples were analyzed for copper and iron content by atomic absorption spectroscopy. The results are summarized in Tables 1, 2 and 3.

TABLE 1

Comparison of Extraction Kinetics at 25° C.

| Sample | % of Equilibrium @ 30 sec | % of Equilibrium @ 60 sec |
|---|---|---|
| 3-MHNAO | 63 | 75 |
| 3-MNSAO | 100 | 99.7 |
| LIX ® 860N-I | 98% | 99% |
| LIX ® 664N-LV | 98% | 98% |
| LIX ® 8180 | 92% | 98% |
| LIX ® 860N-I:3-MHNAO | 84 | 91 |
| LIX ® 664N-LV:3-MHNAO | 80 | 87 |
| LIX ® 8180:3-MHNAO | 79 | 88 |
| 47:53 3-MNSAO:3-MHNAO | 96 | 99 |

TABLE 2

Comparison of Strip Kinetics at 25° C.

| Sample | % of Equilibrium @ 30 sec | % of Equilibrium @ 60 sec |
|---|---|---|
| 3-MHNAO | 50 | 81 |
| 3-MNSAO | 100 | 100 |
| LIX ® 860N-I | 99% | 100% |
| LIX ® 664N-LV | 100% | 100% |
| LIX ® 8180 | 80% | 100% |
| LIX ® 860N-I:3-MHNAO | 78 | 87 |
| LIX ® 664N-LV:3-MHNAO | 77 | 87 |
| LIX ® 8180:3-MHNAO | 36 | 53 |
| 47:53 3-MNSAO:3-MHNAO | 93 | 99 |

TABLE 3

Organic Copper to Iron ratio at 60 seconds at 25° C.

| Sample | Cu/Fe Selectivity at 60 Sec [Cu]/[Fe] |
|---|---|
| 3-MHNAO | 2215 |
| 3-MNSAO | 18397 |
| LIX ® 860N-I | 2987 |
| LIX ® 664N-LV | 4573 |
| LIX ® 8180 | 2970 |
| LIX ® 860N-I:3-MHNAO | 2558 |
| LIX ® 664N-LV:3-MHNAO | 1854 |
| LIX ® 8180:3-MHNAO | 2741 |
| 47:53 3-MNSAO:3-MHNAO | 51470 |

The overall results are surprising. Mixing the 3-MHNAO with LIX® 860N-1, LIX® 664N-LV, and LIX® 8180 result in products with slow/marginal kinetics in extraction and stripping. Surprisingly, the benefit of the faster kinetics of the LIX® 860N-1, LIX® 664N-LV or LIX® 8180 is not observed when any of them is mixed with the 3-MHNAO. Mixing the 3-MHNAO with 3-MNSAO results in a mixture having excellent extraction and stripping kinetics as well as outstanding Cu/Fe selectivity.

Example 2B

The same procedure was used as in Example 2A with the exception that the experiments were carried out at 40° C. The results are summarized in Tables 4, 5, and 6.

TABLE 4

Comparison of Extraction Kinetics at 40° C.

| Sample | % of Equilibrium @ 30 sec | % of Equilibrium @ 60 sec |
|---|---|---|
| 3-MHNAO | 89 | 97 |
| 3-MNSAO | 100 | 100 |
| LIX ® 860N-I | 98 | 100 |
| LIX ® 664N-LV | 98 | 100 |
| LIX ® 8180 | 94 | 99 |
| LIX ® 860N-I:3-MHNAO | 98 | 99 |
| LIX ® 664N-LV:3-MHNAO | 92 | 96 |
| LIX ® 8180:3-MHNAO | 96 | 99 |
| 47:53 3-MNSAO:3-MHNAO | 99 | 100 |

TABLE 5

Comparison of Strip Kinetics at 40° C.

| Sample | % of Equilibrium @ 30 sec | % of Equilibrium @ 60 sec |
|---|---|---|
| 3-MHNAO | 95 | 100 |
| 3-MNSAO | 100 | 100 |
| LIX ® 860N-I | 99 | 99 |
| LIX ® 664N-LV | 100 | 100 |
| LIX ® 8180 | 89 | 97 |
| LIX ® 860N-I:3-MHNAO | 95 | 99 |
| LIX ® 664N-LV:3-MHNAO | 95 | 98 |
| LIX ® 8180:3-MHNAO | 78 | 97 |
| 47:53 3-MNSAO:3-MHNAO | 88 | 99 |

TABLE 6

Organic Copper to Iron ratio at 60 seconds at 40° C.

| Sample | Cu/Fe Selectivity at 60 Sec [Cu]/[Fe] |
|---|---|
| 3-MHNAO | 45200 |
| 3-MNSAO | 13780 |
| LIX ® 860N-I | 3370 |
| LIX ® 664N-LV | 2681 |
| LIX ® 8180 | 2458 |
| LIX ® 860N-I:3-MHNAO | 5718 |
| LIX ® 664N-LV:3-MHNAO | 3379 |
| LIX ® 8180:3-MHNAO | 4968 |
| 47:53 3-MNSAO:3-MHNAO | No detectable iron |

Example 3

Solutions of 3-MNSAO and 3-MHNAO (0.175 M) in Conosol® 170ES were prepared. A series of blends were also prepared by mixing the two solutions at different volume ratios to give 3-MNSAO:3-MHNAO of 0:100, 23:77, 29:71, 36:64, 42:58, 47:52, 60:40 and 100:0. These solutions were then evaluated under conditions of the Standard Cognis Quality Control Test for LIX® Oxime Reagents at 25° C. under the same condition as described in Example 2A. The extraction kinetics and strip kinetics at 60 sec., Cu/Fe selectivity and Net Cu Transfer were determined for each mixture. The results are summarized in Table 7.

TABLE 7

Summary of Kinetics, Cu/Fe Selectivity and Net Cu Transfer at Different 3-MNSAO:3-MHNAO ratios

| Solution (3-MNSAO:3-MHNAO) | Extraction Kinetics % @ 60 Sec | Strip Kinetics % @ 60 Sec | Cu/Fe Selectivity | Net Transfer gpl Cu |
|---|---|---|---|---|
| 0:100 | 75 | 81 | 2215 | 3.90 |
| 23:77 | 82 | 94 | 4010 | 3.56 |
| 29:71 | 96 | 100 | 47420 | 3.45 |
| 36:64 | 100 | 100 | 49130 | 3.31 |
| 42:58 | 100 | 100 | 24785 | 3.10 |
| 47:53 | 100 | 99 | 51570 | 3.00 |
| 60:40 | 100 | 100 | 16920 | 2.64 |
| 100:0 | 100 | 100 | 18397 | 1.51 |

Based on the data in Table 7, the extraction kinetics are marginal at 25° C. for the 23:77 blend, while net transfer is quite high. For the 60:40 blend, the extraction and strip kinetics are excellent, but the net transfer begins to fall off.

Example 4

The hydrolytic stability of the 5-nonylsalicylaldoxime (NSAO), 5-dodecylsalicylaldoxime (DSAO), 2-hydroxy-5-nonylacetophenone oxime (HNAO), 3-MHNAO and 3-MNSAO were determined by preparing solutions of the reagents (about 0.175 M) in Shellsol® D70. These solutions were then contacted with an aqueous solution containing 30 gpl of copper as copper sulfate and 180 gpl sulfuric acid in deionized water. The solutions were stirred in a 3 neck round bottom flask fitted with a condenser, paddle stirrer, and a thermometer. The condenser was fitted with a polyurethane foam plug to minimize evaporation. The flask was immersed in an oil bath heated to 45° C. to maintain constant temperature. The aqueous was periodically replaced, initially on a weekly basis and finally on a monthly basis. Samples were periodically removed at weekly intervals during the first month, and then monthly thereafter. The samples were max loaded with copper under the conditions of the Standard Cognis Quality Control Test for LIX® Oxime Reagents at 25° C. The residual oxime content was calculated based on the copper max load values assuming a complex consisting of two oximes per copper. The results were plotted against time and a point at which half the oxime remained was determined by extrapolation. This was termed the half life of the oxime. The results are summarized in Table 8.

TABLE 8

Summary of Reagent Half Lives

| Reagents | Half Life (Days) |
|---|---|
| NSAO | 90 |
| DSAO | 167 |
| HNAO | 325 |
| 3-MHNAO | 2100 |
| 3-MNSAO | 725 |

3-MNSAO is approximately 7 times more hydrolytically stable than NSAO and 3-MHNAO is 6.5 times more hydrolytically stable than HNAO.

Example 5

Solutions of 3-methyl aldoxime, 3-methyl-ketoxime and a blend using 28.8% 3-methyl aldoxime and 71.2% 3-methyl-ketoxime were made up such that they were roughly 0.11M total oxime in Conosol® 170ES diluent. Solutions of various metals were made up approximately 0.05M in DI water and the pH adjusted to a pH of 1.0 with dilute sulfuric acid. Individually each organic was contacted in a baffled beaker using a magnetic stir bar for agitation at an O:A of 1:1 with an aqueous solution containing one metal. A pH probe was used to monitor the pH of the aqueous continuous emulsion. Once the pH was stable indicating that the system was at equilibrium, a sample of emulsion was drawn, the phases were allowed to separate and samples of the organic and aqueous phases were saved separately for analysis by atomic absorption spectroscopy. Once a sample was drawn the pH was increased by adding a portion of an aqueous ammonium hydroxide solution, the mixture was allowed to equilibrate and another emulsion sample was drawn and labeled with the pH for organic and aqueous analysis. The pH was adjusted slowly drawing samples at intervals up to a pH of 7. The results are reported below in Table 9 with percentage of metal extracted by the reagent with respect to pH for each metal and reagent.

TABLE 9

Metal extraction over a pH range for various reagent blends

| | | pH | | | | | | |
|---|---|---|---|---|---|---|---|---|
| | | 1 | 2 | 3 | 4 | 5 | 6 | 7 |
| | | 28.8% 3-MNSAO and 71.2% 3-MHNAO | | | | | | |
| Percent Metal Extracted from Aqueous | Cu | 45% | 90% | 100% | 100% | 100% | 100% | 100% |
| | Fe | 0% | 5% | | | | | |
| | Ni | 0% | 0% | 0% | 50% | 80% | 95% | 95% |
| | Co | 0% | 0% | 0% | 0% | 5% | 20% | 70% |
| | | 3-MNSAO | | | | | | |
| Percent Metal | Cu | 85% | 95% | 100% | 100% | 100% | 100% | 100% |
| | Fe | 0% | 30% | | | | | |

TABLE 9-continued

Metal extraction over a pH range for various reagent blends

| | | pH | | | | | | |
|---|---|---|---|---|---|---|---|---|
| | | 1 | 2 | 3 | 4 | 5 | 6 | 7 |
| Extracted from Aqueous | Ni | 0% | 0% | 0% | 90% | | | |
| | Co | 0% | 0% | 0% | 0% | 40% | 95% | 100% |
| | Mo | 65% | 70% | 70% | | | | |
| | | | | 3-MHNAO | | | | |
| Percent Metal Extracted from Aqueous | Cu | 50% | 90% | 100% | 100% | 100% | 100% | 100% |
| | Fe | 0% | 5% | | | | | |
| | Ni | 0% | 0% | 0% | 40% | 85% | 90% | 95% |
| | Co | 0% | 0% | 0% | 0% | 5% | 45% | |
| | Mo | 65% | 65% | 65% | 35% | 30% | | |

Example 6

Solutions (0.52 M) of LIX®8180, methyl aldoxime (3-MNSAO) and methyl ketoxime (3-MHNAO) in Conosol® 170ES, a typical hydrocarbon diluent from Conoco Phillips for solvent extraction applications, were prepared. The organics were tested using the Blue Line Technical Bulletin Cognis Quality Control Test For LIX® Nickel Oxime Reagents. The extraction and ammonia loading portion of this experiment was repeated for the LIX®8180 and 3-MHNAO replacing the Standard Nickel Extraction Aqueous Phase with a solution that contains 15±0.1 g/l $Cu_{+2}$ (as sulfate), 32.5 g/l $NH_3$ and 25 g/l $(NH_4)_2SO_4$ drawing samples at 30, 60, 90 and 300 seconds. Extraction of the metals from ammonia aqueous solutions, the extraction of ammonia from loaded organic and the stripping of nickel were recorded. Molarity of ammonia loaded on the organic phase is reported after filtering to remove the entrained aqueous, results of extraction are reported as percentage extracted from the aqueous extraction solution, results of stripping are reported as the percentage of metal removed from the loaded organic. The results are summarized in Table 10.

TABLE 10

Nickel and Copper

| | Nickel Test | | | | Copper Test | |
|---|---|---|---|---|---|---|
| | LIX® 8180 | 3-MNSAO | 3-MHNAO | | LIX® 8180 | 3-MHNAO |
| E30 | 93.93% | 78.33% | 64.80% | E30 | 94.73% | 96.07% |
| E300 | 94.60% | 94.33% | 90.40% | E60 | 94.40% | 95.80% |
| S10 (600 sec) | 99.42% | 15.83% | 27.43% | E90 | 94.67% | 95.93% |
| S20 (1200 sec) | 99.92% | 35.12% | 53.17% | E300 | 94.47% | 96.07% |
| | | | Ammonia loading | | | |
| M of NH3 | 0.00804 | 0.00274 | 0.00355 | M of NH3 | 0.00947 | 0.00235 |

It can be seen from the results above that 3-MNSAO and 3-MHNAO load significantly less ammonia than LIX® 8180 which is based on the standard ketoxime which is currently the reagent of choice for extraction of nickel and copper from ammonia.

Example 7

Solutions of 3-methyl-ketoxime and a blend consisting of 28.8% 3-methyl aldoxime and 71.2% 3-methyl-ketoxime were made up such that they were roughly 0.175 M oxime in Conosol® 170ES diluent. Both solutions were further spiked to give concentrations of 0.0028M, 0.014M, or 0.028M 5,8-diethyl-7-hydroxydodecan-6-oxime (LIX® 63 Oxime) and a blank to give a total of eight solutions. These were contacted with a synthetic aqueous PLS (6 g/L Cu, 3 g/L Fe with a pH of 2 in DI water) following the standard QC test with some modifications, it was scaled down to 100 ml of each solution in a 250 ml baffled jacketed beaker at 25° C. Kinetic samples were drawn at 30, 60, 90, and 300 sec and saved for copper analysis by atomic absorption spectroscopy. The remaining organic from the previous step was contacted at an O:A 1:1 with a synthetic electrolyte aqueous solution (35 g/L Cu and 160 g/L free sulfuric acid in DI water). Kinetic samples were drawn at 30, 60, 90, and 300 sec and saved for copper analysis by atomic absorption spectroscopy. The kinetic data is summarized in Table 11.

TABLE 11

Summary of metallurgical data for LIX ®63 copper experiment

| | Percent copper extraction | | Percent copper stripped | | Iron loaded |
|---|---|---|---|---|---|
| | Cu @ 30 sec | Cu @ 60 sec | Cu @ 30 sec | Cu @ 60 sec | E30 Cu/Fe |
| 3MHNAO | 46.0% | 59.6% | 24.6% | 31.1% | 589 |
| 3MHNAO & 0.0028M LIX ® 63 Oxime | 48.2% | 63.3% | 33.8% | 37.8% | 1558 |
| 3MHNAO & 0.014M LIX ® 63 Oxime | 61.8% | 79.4% | 29.4% | 34.0% | 2191 |
| 3MHNAO & 0.028M LIX ® 63 Oxime | 69.7% | 81.9% | 18.2% | 25.1% | 1814 |
| 3M Blend | 64.8% | 75.6% | 52.2% | 64.6% | 633 |
| 3M Blend & 0.0028M LIX ® 63 Oxime | 65.1% | 81.1% | 42.6% | 48.1% | 1479 |
| 3M Blend & 0.014M LIX ® 63 Oxime | 70.4% | 79.9% | 42.5% | 50.3% | 1343 |
| 3M Blend & 0.028M LIX ® 63 Oxime | 77.9% | 88.3% | 44.2% | 58.3% | 1525 |

Addition of the 5,8-diethyl-7-hydroxydodecan-6-oxime resulted in faster extraction kinetics with no significant improvement in stripping kinetics.

Example 8

Solutions containing 3-methyl aldoxime, 3-methyl ketoxime and a blend consisting of 28.8% 3-methyl aldoxime and 71.2% 3-methyl ketoxime were made up such that they were roughly 0.175 M in total oxime and contained either 0.0007 or 0.0149 M of a thermodynamic modifier. The hydrocarbon diluent was Conosol® 170ES diluent. The thermodynamic modifiers were di-n-butyl adipate (DBA), iso-tridecanol (TDA) and 2,2,4-trimethyl-1,3-pentanediol di-isobutyrate (TXIB). These solutions were then contacted with a synthetic aqueous PLS (6 g/L Cu, 3 g/L Fe with a pH of 2 in DI water) to demonstrate loading of the metal and then contacted with a synthetic electrolyte aqueous solution (35 g/L Cu and 160 g/L free sulfuric acid in DI water) to remove the metal. These contacts were done at an O:A of 2:1 for extraction 20 ml to 10 ml and 1:1 for stripping 10 ml to 10 ml on an autoshaker with 30 ml separatory funnels. The loaded and stripped organic samples were analyzed for copper and iron by atomic absorption spectrometry. The copper and iron values of the resultant solutions of each contact are reported in Table 12.

TABLE 12

Thermodynamic Modifier Blend Data

| Thermo-dynamic Modifier | | 3-MNSAO | | | 3-MHNAO | | | Blend of 3-MNSAO and 3-MHNAO | | |
|---|---|---|---|---|---|---|---|---|---|---|
| | | Loaded Organic Copper (gpl) | Stripped Organic Copper (gpl) | Loaded Organic Iron (gpl) | Loaded Organic Copper (gpl) | Stripped Organic Copper (gpl) | Loaded Organic Iron (gpl) | Loaded Organic Copper (gpl) | Stripped Organic Copper (gpl) | Loaded Organic Iron (gpl) |
| DBA | .0007 | 2.776 | 3.182 | 0.0074 | 0.975 | 0.535 | 0.0048 | 1.875 | 1.086 | 0.0042 |
| DBA | .0149 | 2.393 | 1.728 | 0.0032 | 0.707 | 0.304 | 0.0033 | 1.364 | 0.493 | 0.0031 |
| TDA | .0007 | 2.886 | 3.199 | 0.0071 | 0.96 | 0.387 | 0.005 | 1.934 | 1.078 | 0.0042 |
| TDA | .0131 | 2.604 | 1.857 | 0.0027 | 0.752 | 0.168 | 0.0039 | 1.579 | 0.498 | 0.0033 |
| TXIB | .0008 | 2.896 | 3.359 | 0.0082 | 0.91 | 0.517 | 0.005 | 1.593 | 1.159 | 0.006 |
| TXIB | .0169 | 2.492 | 2.137 | 0.0045 | 0.774 | 0.346 | 0.004 | 1.269 | 0.628 | 0.0049 |
| No additive | | 2.919 | 3.694 | 0.0103 | 1.003 | 0.572 | 0.0055 | 1.854 | 1.306 | 0.006 |
| No additive | | 2.925 | 3.694 | 0.0105 | 0.961 | 0.526 | 0.0053 | 1.873 | 1.333 | 0.006 |

The data indicates that addition of thermodynamic modifiers can be used to adjust the stripping behavior of these reagents.

Example 9

The Cognis Quality Control Test for LIX® Nickel Oxime Reagents was modified to reduce the volume of organic solution required. The test involves extraction of nickel from an ammoniacal solution followed by stripping with a sulfuric acid solution. Three organic solutions were prepared to contain 0.5M 3-methyl aldoxime and varying levels (0.0028M, 0.028M, and 0.14M) of 5,8-diethyl-7-hydroxydodecan-6-oxime (LIX®63 Oxime) in Conosol® 170 ES diluent. The starting organic volume was scaled down to 100 ml and all other volumes scaled down proportionally. The mixing took place in a 250 ml baffled jacked beaker with a 3.175 cm diameter QC impellor at 1750 RPM. Samples were drawn for extraction at 30, 60, 90, and 300 seconds and for strip at 1, 5, 10, and 20 min. The percent of stripping was calculated as the difference between the nickel concentration at 300 sec of extraction and the nickel concentration at a given stripping time divided by the nickel concentration at 300 sec of extraction times 100. All other experimental parameters were held the same as the standard procedure. The results are summarized in Table 13.

TABLE 13

Effect of 5,8-diethyl-7-hydroxydodecan-6-oxime concentration on kinetics of extraction of nickel from ammonia and stripping of nickel with acid from 3-methyl aldoxime

| | | 0.0028M LIX ® 63 Oxime | | 0.028M LIX ® 63 Oxime | | 0.14M LIX ® 63 Oxime | |
|---|---|---|---|---|---|---|---|
| | | g/L Ni | % of final | g/L Ni | % of final | g/L Ni | % of final |
| Extraction (sec) | 30 | 2.11 | 87.63% | 1.65 | 84.46% | 2.05 | 89.32% |
| | 60 | 3.08 | 94.65% | 2.96 | 93.97% | 3.22 | 98.01% |
| | 90 | 3.54 | 97.93% | 3.56 | 98.26% | 3.45 | 99.73% |
| | 300 | 3.82 | 100.00% | 3.80 | 100.00% | 3.49 | 100.00% |

TABLE 13-continued

Effect of 5,8-diethyl-7-hydroxydodecan-6-oxime concentration on kinetics of extraction of nickel from ammonia and stripping of nickel with acid from 3-methyl aldoxime

| | | 0.0028M LIX ® 63 Oxime | | 0.028M LIX ® 63 Oxime | | 0.14M LIX ® 63 Oxime | |
|---|---|---|---|---|---|---|---|
| | | g/L Ni | % of final | g/L Ni | % of final | g/L Ni | % of final |
| Strip (min) | 1 | 3.26 | 4.08% | 2.93 | 6.30% | 1.25 | 16.58% |
| | 5 | 2.41 | 10.23% | 0.64 | 22.91% | 8.07 | 40.21% |
| | 10 | 1.94 | 13.64% | 7.97 | 42.20% | 4.92 | 63.56% |
| | 20 | 0.60 | 23.33% | 5.57 | 59.61% | 1.53 | 88.63% |

The addition of 5,8-diethyl-7-hydroxydodecan-6-oxime does not have an appreciable effect of the kinetics of extraction of nickel from ammoniacal solutions by 3-methyl aldoxime. Extraction from ammoniacal solutions is typically very fast in any case and any incremental changes would be hard to detect. In the case of stripping, however; addition of the 5,8-diethyl-7-hydroxydodecan-6-oxime significantly improves stripping kinetics.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method for the recovery of metal from a metal-containing aqueous solution at an elevated temperature, the method comprising:

contacting the metal-containing aqueous solution with an organic phase comprising a water immiscible solvent and a reagent composition comprising a ketoxime having a structure represented by:

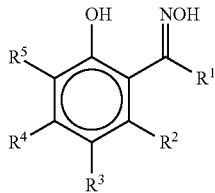

wherein $R^5$ is a $C_{1-22}$ linear or branched alkyl group; $R^1$ is a $C_{1-22}$ linear or branched alkyl or alkenyl group, a $C_6$ aryl group or a $C_{7-22}$ aralkyl group; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group to extract at least a portion of the metal into the organic phase to provide a metal-pregnant organic phase and a metal-barren aqueous phase;

separating the resultant metal-pregnant organic phase from the metal-barren aqueous phase; and recovering metal from the metal-pregnant organic phase.

2. The method of claim 1, wherein $R^5$ is methyl.

3. The method of claim 1, wherein $R^3$ is nonyl.

4. The method of claim 1, wherein the ketoxime has a structure represented by:

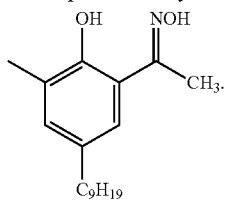

5. The method of claim 4, wherein the reagent composition further comprises an aldoxime having a structure represented by:

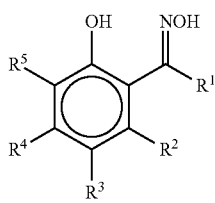

wherein $R^5$ is a $C_{1-22}$ linear or branched alkyl group; $R^1$ is hydrogen; $R^2$-$R^4$ are each independently hydrogen, halogen, a linear or branched $C_{6-12}$ alkyl group, $OR^6$ wherein $R^6$ is a $C_{1-22}$ linear or branched alkyl group, a $C_{2-22}$ linear or branched alkenyl group, a $C_6$ aryl group, or a $C_{7-22}$ aralkyl group.

6. The method of claim 5, wherein $R^5$ is methyl.

7. The method of claim 5, wherein $R^3$ is nonyl or dodecyl.

8. The method of claim 6, wherein the aldoxime is a 3-methyl aldoxime having a structure represented by:

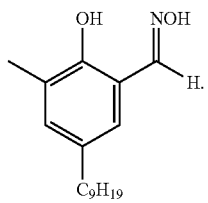

9. The method of claim 1, wherein the recovery of metal occurs at a temperature above about 35° C.

10. The method of claim 9, wherein the recovery of metal occurs at a temperature above about 50° C.

11. The method of claim 1, wherein the concentration of ketoxime ranges from about 0.018M to about 1.1M.

12. The method of claim 1, wherein the concentration of ketoxime ranges from about 0.018M to about 0.9M.

13. The method of claim 12, wherein the concentration of ketoxime ranges from about 0.018M to about 0.72M.

14. The method of claim 5, wherein the concentration of both ketoxime and aldoxime ranges from about 0.018M to about 0.9M.

15. The method of claim 14, wherein the concentration of both ketoxime and aldoxime ranges from about 0.018M to about 0.72M.

16. The method of claim 5, wherein the ketoxime is a 3-methyl ketoxime and the aldoxime is a 3-methyl aldoxime, and the reagent composition comprises a molar ratio of ketoxime to aldoxime having a range of about 85:15 to about 25:75.

17. The method of claim 1, wherein the metal is selected from the group consisting of copper, uranium, molybdenum, nickel, zinc, cobalt and combinations thereof.

18. The method of claim 1, wherein the reagent composition further comprises a thermodynamic modifier and/or kinetic modifier.

19. The method of claim 1, wherein $R^5$ is a $C_{1-3}$ linear or branched alkyl group.

* * * * *

UNITED STATES PATENT AND TRADEMARK OFFICE
CERTIFICATE OF CORRECTION

PATENT NO. : 8,529,850 B2  Page 1 of 1
APPLICATION NO. : 13/401930
DATED : September 10, 2013
INVENTOR(S) : Michael Virnig, Jack Bender and Nathan C. Emmerich It is certified that error appears in the above-identified patent and that said Letters Patent is hereby corrected as shown below:

On the Title Page, Item (54) and in the Specification, Column 1, Lines 1-2, please correct the following:

"COMPOSITIONS AND METHODS OF USING A KETOXIME IN A METAL SOLVENT" should be changed to "COMPOSITIONS AND METHODS OF USING A KETOXIME IN A METAL SOLVENT EXTRACTION REAGENT"

Signed and Sealed this
Twenty-first Day of October, 2014

Michelle K. Lee
*Deputy Director of the United States Patent and Trademark Office*